United States Patent Office 3,072,501
Patented Jan. 8, 1963

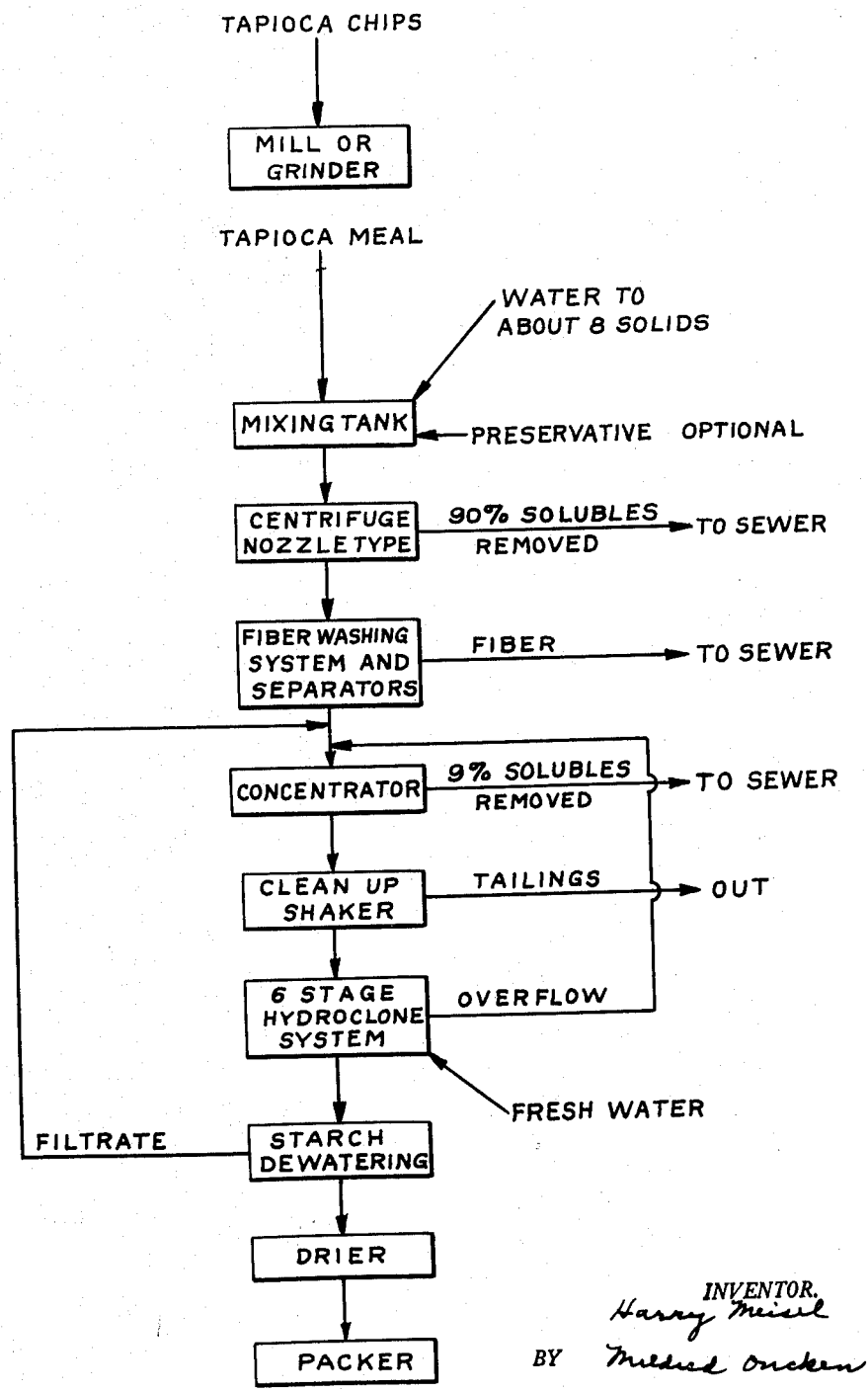

3,072,501
TREATMENT OF STARCH-BEARING MATERIALS
Harry Meisel, Englewood, N.J., assignor to Corn Products Company, New York, N.Y., a corporation of Delaware
Filed Sept. 14, 1959, Ser. No. 839,738
9 Claims. (Cl. 127—67)

This invention relates to an improved method for separating, from each other, the various constituents of dried starch-bearing materials. More particularly, the method comprises a milling operation of the dried starch-bearing materials, followed by rehydration of the resultant flour in an aqueous medium and subjecting the slurry to a continuous centrifugal separation. The soluble constituents are thereby removed substantially instantaneously and completely from the system prior to any other separating operations.

The invention is applicable in whole or in part to all starch-bearing materials, and is particularly applicable to dried starch-bearing roots, e.g., tapioca, sweet potato, and will be described mainly in reference thereto although it is not intended to limit the invention thereby.

The principal and most important constituent of starch-bearing materials is, of course, the starch. In recovering the starch there are two main problems, namely, the release in good yield, of the starch granules from their cells, and separation of the released starch from the other constituents, particularly the soluble constituents. This invention is concerned with improvements in both areas and makes decided departures from present practices.

Starch-bearing materials contain several insoluble constituents besides the starch, such as fibrous materials, insoluble proteins, and in the case of grain, oil. If the starch is desired in more or less pure form, it must be separated from the aforementioned insoluble materials. Starch-bearing materials also contain a variety of soluble constituents which may be classed broadly as mineral salts, soluble carbohydrates including gums, pectins and sugars, and soluble proteins including albumins. These constituents are referred to collectively as "solubles" and in the case of root starches as "fruit water." The term "solubles," as used hereinafter, is intended to include all of the truly soluble constituents of the starch-bearing materials and also those constituents which are colloidal. The starch must, of course, be separated from the solubles also. In tapioca, the iner skin or rind contains very little starch but contains the major portion of the solubles.

Referring first to the problem of releasing the starch granules so that they may be recovered, the first step to accomplish this in treatment of starch-bearing materials is the grinding operation although in the case of wet milling of corn (maize) this is preceded by a steeping operation to remove up to 70 percent of the solubles and to condition the corn for better release of starch. However, in the case of root starches with which the invention is particularly concerned the grinding or pulping operation is the first step.

In the wet processing, i.e., separation, of starch-bearing materials, it has been customary to grind the materials in wet condition by means of attrition mills or similar type equipment. For example, tapioca roots as harvested and containing 65 to 70 percent of water are ground or pulped, or if they have been dried, they are rehydrated prior to grinding or pulping. Grains, after steeping, are ground in the wet condition containing approximately 45 to 50 percent of water. Such grinding, i.e., by attrition, is not overly efficient since it does not release a desirably high percentage of starch granules from the cells containing them, hence a large percentage of starch remains bound with the residue fiber. Several stages of regrinding are used to obtain better yields of released starch. Furthrmore, as a consequence of regrinding, there is produced an undesirably large amount of fine fibrous material from which it is difficult to separate the starch. It has recently been proposed in copending applications Serial No. 775,908, filed November 24, 1958, now U.S. Patent No. 3,029,169 (continuation-in-part of Serial No. 757,420, filed August 26, 1958, now abandoned, which is a continuation-in-part of Serial No. 621,926, filed November 13, 1956, now abandoned) and Serial No. 767,324, filed October 15, 1958, now U.S. Patent No. 3,029,168 (continuation-in-part of Serial No. 692,876, filed October 28, 1957, now abandoned) to liberate starch granules from wet starch-bearing material by feeding it into a rotor which impels it outwardly under centrifugal force against impacting surfaces, such as targets of various shapes and sizes. The violence of this impacting action bursts the cellulosic envelopes containing the starch granules, thereby releasing the starch granules without materially reducing the size of the fibrous materials. This action facilitates the washing steps which follow, thus materially reducing the quantity of starch held by the residual fiber. For the sake of convenience, the above-described equipment is referred to as an impact mill.

Although the use of impact mills to liberate starch from wet starch-bearing materials marks a great step forward in this art, the process is not as effective, for example, on rehydrated tapioca chips as on freshly harvested roots. The rehydration of the chips is a slow process and requires 18 to 24 hours and is detrimental for other reasons appearing hereinafter. Nor does it eliminate the long steeping period, e.g., 35 to 50 hours, in the wet milling of grains, such as corn (maize). Although the yields of starch released are greatly improved over those previously obtained (15 to 20 percent of starch in residual fiber compared to 30 to 40 percent by older methods, in tapioca processing, for example), it is desirable to use a grinding operation which will release still more starch.

Referring now to the solubles, it is well known in the art that solubles, due to the fact that they are ideal nutrients for growth of microorganisms, are the cause of great difficulties in the separating operations, and it would appear logical because of this biological sensitivity that they be removed prior to any other separating operations. However, their removal has always been accomplished, more or less, a little at a time and spread out and prolonged throughout the entire process with emphasis on removal of solubles by a countercurrent washing method, i.e., cycling back and reuse of wash water. Standard practice consists of first separating fiber from the ground pulp, then recovering, and, finally, washing the starch free of solubles.

Attempts to accomplish more efficient and early removal of solubles in wet milling of starch-bearing materials have been made. In order to better understand the reasons for their failure, a brief description of the behavior of solubles and the difficulties arising from their presence in current systems, particularly where starch-bearing roots are involved, will first be presented.

Basically, most of the difficulties arising from the growth of microorganisms in the recovery of starch from roots or tubers by a wet system lies in the soluble constituents. For example, tapioca roots contain a mixture of soluble protein, which is albuminous in nature, and soluble carbohydrates, some of which are sugars. Sweet potatoes contain a considerably higher amount of sugars than tapioca, in addition to coloring matter and pectin. The solubles can be extracted from the fresh roots with water if the system is kept fresh and the pH maintained over 6.0. However, this is virtually impossible since the temperature (in the tropics where the roots are generally processsed) and the medium (the ground roots in water) are ideal for the growth of microorganisms. Molds and yeasts thrive and the filamentous, slimy-type of mold will grow predominantly and very rapidly with the result that organic acidity develops with a corresponding decline in pH to the region of 3.5 to 4.5.

The consequences of these natural reactions in the milling system are manifested rapidly in the process:

(1) With the drop in pH, the albumins, which were originally water-soluble or colloidal in nature, coagulate or floc out and will remain imbedded in the starch to the end of the process. Even the finest screens will not remove this coagulated protein. Machines known as purifiers are sometimes used to eliminate the coagulated proteins but this always entails a considerable loss of prime starch. Most plants have been forced to produce two or more grades of starch because of this situation. In the more primitive plants, 25 percent of the total starch will be commited to off-grade starch due to the difficulty of removing the flocculent protein material from the starch proper.

(2) The second and more vicious effect of temperature and of pH drop is the rapid development and growth of mold in the pulped or ground roots suspended in water. The predominant organism is a mold of the ropy type that lodges in all the screening surfaces be they silk, nylon or metal, and which rapidly develops a filamentous mycelium which will blind the screening area in just an hour or two, making it practically impossible to separate starch from fiber. In factories where a countercurrent washing system is employed, operation is most difficult. With a straight wash system where fresh water is used at each wash station, operation is a little easier. The problem of keeping screens from binding while attempting to remove the fiber washed free of starch, is by far the most difficult one.

Incidents can be cited where mycelium growth on screens developed to a length of as much as two inches in just a few hours of operation. Further, should the mycelium be permitted to dry on the screens, they (the screens) are rendered worthless as it is practically impossible to remove the growth once it has dried. Instances are known where the only method of removing this dried fungus from the metal screen was by burning it off with a blow-torch.

(3) The fiber-starch mixture itself becomes slimy and gummy due to bacterial growth and the presence of such sticky material causes the starch granules to adhere tenaciously to the fibers, making separation of the two from each other very difficult. Repeated separating operations are necessary if a good grade of starch is to be obtained.

Various attempts have been made to minimize the growth of microorganism during the process, for example, preservatives, such as sulfur dioxide and chlorine, have been used. However, such enormous quantities of these substances must be used to suppress bacterial action that they exert a modifying action on the starch and change its inherent characteristics to an undesired degree. Furthermore, the cost is often prohibitive. Also, sulfur dioxide reacts with the fruit water and iron which discolors the starch due to formation of an iron-cyanide complex.

Generally, the time the solubles are present in the process is at least 18 hours, and longer, more often 72 hours, in many plants, hence it is obvious that there is a necessity to remove solubles as rapidly after pulping as possible.

In general, the problem of the solubles in wet milling of grains is not nearly as difficult as in the case of root starches. As already mentioned some of the solubles are removed by steeping and separating operations can be carried out in colder climates in contrast to the tropics for tapioca roots, for example. The removal of the residual solubles is not accomplished, however, until after the fiber is washed and removed from the process.

As already mentioned, attempts have been made to effect early removal of solubles in the processing of starch-bearing materials. For example, in U.S. Patent No. 2,307,725, it is proposed to subject the discharge from Buhr mills in the wet milling of corn (maize) to a washing operation to remove solubles. It is also proposed to subject pulp from white potatoes to a washing operation on washing type filters. In U.S. Patent No. 2,443,897, it has been proposed to remove a high percentage of the solubles from sweet potato pulp by grinding the potatoes in the presence of lime water and subjecting the pulp diluted with starch milk from a later stage in the process to centrifugal separation. However, as far as applicant is aware, these methods have not been successful, mainly because a part of the starch and solubles remained in the overflow of the first separating step and it was necessary to recycle them in order to prevent loss of starch. Hence, the problem of bacterial action was not eliminated. There were also other disadvantages. For example, in using a washing type of filter, it is necessary to use the feed at a gravity of at least about 12° Bé. (21 percent solids) and preferably 15° Bé. (30 percent solids) which necessitates reslurrying the filter cake and repeating the operation to obtain the desired washing efficiency. Furthermore, the filtrates from these step-wise filtrations contain a considerable amount of starch which must be recycled to prevent this loss.

In U.S. Patent No. 2,443,897, a continuous solid bowl separator was used. This machine is more of a thickener than a separator and permits a large percentage of starch and fiber to leave in the overflow containing the solubles. Therefore, it is necessary to recycle the overflow to keep the starch in the process. Recycling, of course, lengthens the time the solubles are in the process and gives the microorganisms an opportunity to grow and produce their described hazards. Furthermore, starch milk from a later stage in the process and which still contains solubles was mixed with the pulp to make up the feed to the machine. Hence, solubles remained in the process more or less indefinitely.

It will be apparent from the foregoing discussion that there is a need for an improved process for separating the constituents of starch-bearing materials whereby all of the aforementioned difficultes are overcome.

The main object of the present invention is to provide certain improvements in the recovery of starch from dried starch-bearing materials, e.g., tapioca roots, whereby the process is simplified, the yield and quality of starch increased, and the cost thereof is decreased. A specific object of the invention is to provide a process for recovering starch from starch-bearing roots which can be carried out in a cold climate in contrast to the tropics as is the practice now. Another object of the invention is to provide a process whereby dried starch-bearing materials can be readily rehydrated. Another object of the invention is to provide a method for the substantially instantaneous and complete removal of solubles from starch-bearing materials, e.g., starch-bearing roots. Another object is to provide a method for removal of solubles from starch-bearing materials prior to the separation of insoluble constituents. Yet another object is to provide a process for more efficient release of starch granules from starch cells containing them. Still another object is to provide a process for recovering starch from starch-bearing roots wherein off-grade starch is eliminated. Other objects will appear hereinafter.

The present invention comprises milling dried starch-bearing materials to a predetermined size, rehydrating the resultant flour or meal in an aqueous medium and subjecting the resultant slurry to continuous centrifugal separation to separately remove the soluble constituents in an overflow and the starch and fiber in an underflow.

The milling operation, the rehydration of the flour and removal of the solubles are all accomplished in a matter of minutes.

The starch may be separated from the fiber and other insoluble constituents by means of known starch and fiber separating devices, e.g., reels, shakers, screen pumps, centrifuges, hydroclones, etc. Or the mixture of starch and fiber may be subjected directly to acid or enzyme conversion to convert the starch to a sugar-containing sirup.

In carrying out the invention as applied to tapioca roots, the dried material, i.e., tapioca chips are milled or ground in the dried form in conventional manner sufficiently to break the cells containing the starch granules into fragments. For example, tapioca root cells containing the starch granules, will range from 200 to 800 microns in size, hence the particle size of the milled material should be somewhat smaller than the cells themselves, the exact size depending upon the type of tapioca.

The flour or meal from the milling operation is then rehydrated in water or an aqueous medium which may be acid or alkaline to aid in rehydration and separation. The milling operation reduces the cellulosic envelopes containing the starch granules into fragments. These fragments consist of agglomerates of starch granules to which is attached dried soluble material and part of the cellulosic envelope. In this form the starch-bearing material rehydrates substantially instantaneously and eases the release of the individual starch granules from the fragments. Within a few minutes the resultant slurry is in condition to be passed through a centrifuge.

The pH of the slurry should be that of the fresh starch-bearing material, e.g., 6.5 to 7.0, or even higher, if desired, in the case of tapioca and sweet potatoes.

If the dried material has been stored under proper conditions ordinarily no adjustment of pH is required, depending upon the pH of the water used. However, in instances where tapioca chips, for example, have not been dried and stored under proper conditions, an acidic condition may develop due to fermentation. Then an adjustment of the pH should be made accordingly.

If the flour or meal is rehydrated under the same pH conditions as exist in the fresh material, the proteins, the gums and sugars, for example, will redissolve and the soluble protein, in the case of tapioca or sweet potatoes, for example, will remain soluble unless the pH drops due to bacterial action. As already mentioned, coagulated proteins are difficult to separate from starch. Accordingly, it is desirable and practicable to avoid this difficulty by centrifuging the slurry immediately after the rehydration takes place so that the albumins leave the system in soluble form, as contrasted with coagulated form, with the rest of the solubles in the overflow. If, for any reason, this cannot be done, a preservative such as chlorine, sulfur dioxide, etc., may be added to the slurry to keep down bacterial growth, as a protective measure. (A preservative may, of course, also be added anywhere in the process in case of emergency, such as a shut-down.)

One of the advantages of the present invention is that the time required to rehydrate the starch-bearing material and to remove solubles is so short that there is little or no opportunity for the growth of microorganisms prior to or subsequent to removal of solubles.

Any centrifuge which will efficiently and continuously separate solids from liquids may be used. Preferably, the centrifuge should be of the type which is equipped to return a part of the underflow back into the centrifuge chamber. Wash water may be introduced with the material being returned to the centrifuge chamber. Alternatively, the wash water may be introduced separately into the periphery of the centrifuge bowl. The underflow in such machine discharges through nozzles which have openings of varying sizes. These machines are well known in the art and are sometimes referred to as nozzle type centrifuges. The nozzle openings must, of course, be large enough to allow the slurry containing the milled starch-bearing material to pass through without clogging. However, if the material is milled to the size aforementioned, there is no danger of clogging since the nozzles now available have openings at least as large as 2200 microns. A centrifuge suitable for purposes of the present invention is illustrated by U.S. Patent No. 2,013,668 although other centrifuges having the aforementioned characteristics are satisfactory also.

Centrifuges of the nozzle type are designed to handle a liquid feed having a solids content as low as 8 percent (4.5° Bé.). This is advantageous in the present invention as it permits the use of a dilute slurry, i.e., removal of solubles by high dilution, with the result that about 90 percent of the solubles may be removed in a matter of seconds, in a single operation. Now, the underflow containing only about 10 percent of the total original solubles will not produce the previously described processing difficulties of fungal growth, thus making fiber separation and fiber washing simple and highly efficient operations. The underflow from the centrifuge may be passed through a second centrifuge to remove residual solubles although this may be accomplished later in the process in other ways. Moreover, the use of such centrifuge also permits recovery of the starch (and fiber) in one stream while removing substantially all of the solubles in the other stream in contrast to prior art practices where a high percentage of starch leaves with the solubles, necessitating recycling for economic operation.

The starch-fiber mixture from which substantially all of the solubles have been removed may be treated in conventional manner to recover starch in pure form, or it may be used in the preparation of sugar-containing sirups by acid or enzyme conversion or a combination of the two.

An illustration of the invention in a preferred embodiment for tapioca chips will now be given. Referring to FIGURE 1, tapioca chips (moisture content about 12 percent, and starch content 68 percent) were ground in a conventional mill to a particle size of about 100 microns. The flour was placed in a mixing tank equipped with an agitator and fresh water was added in sufficient quantity to produce a slurry having a solids content of about 8 percent. A solids content up to 10 percent is permissible although it is preferable to use as dilute a slurry as possible. The pH of the slurry was 7.0. The slurry was immediately fed to a centrifuge of the nozzle type having nozzle openings of 2200 microns. The centrifuge was operated at a speed of 5600 r.p.m. The overflow containing 90 percent of the solubles and free of starch was discarded directly to the sewer. The underflow containing all of the starch and fiber entered a fiber washing and separating system consisting of conventional reels and screens where the fiber was separated, washed free of liberated starch and discarded. The mill starch was passed through a concentrator and the overflow containing substantially all of the remainder of the solubles (about 9 percent) was sewered. The starch underflow from the centrifuge was passed through a clean up shaker and then through a 6 stage hydroclone system operating countercurrently to remove traces of fiber and solubles from the starch. The overflow was reused in the process ahead of the concentrator. Fresh water was introduced at the hydroclone stage. The starch obtained from the hydroclone operation was dewatered and dried. The filtrate from the dewatering stage was returned to the hydroclone and concentrating stations.

The yield of starch recovered was about 95 percent of the starch present in the flour, on a dry basis. All of the starch recovered was of prime quality, there being no off-grade starch, one of the many advantages of the present invention.

In preparing the substantially desolubilized starch-fiber mixture for conversion of the starch therein to sugar-containing sirups, the underflow from the first centrifuge station was passed through a washing centrifuge and a hydroclone washing system to remove residual solubles.

When grain, such as corn (maize), is subjected to the aforementioned operations, it is advisable to first degerminate the corn before milling or to deoil the corn flour or meal before making the slurry from which solubles are to be removed by centrifugal separation.

The present invention provides decided advantages over the prior art, perhaps the most outstanding feature being the short processing time, particularly for removing solubles, which in turn obviates all of the difficulties arising from a long, drawn out processing time. It was unexpected to find that the combination of milling in the dry form to condition the starch-bearing material for instantaneous rehydration, and passing the resultant slurry through the described centrifuge would remove up to 90 percent of the solubles in single pass. This permits the small percentage of solubles remaining (i.e., about 10 percent) to be quickly and readily removed in subsequent stages. The total processing time is reduced considerably, to as low as 2 hours. Another outstanding feature is the elimination of bacterial action which permits speedy recovery of starch in prime form, no off-grade cuts being produced.

Dry milling permits all of the material to be ground to the same size and to break the starch-containing cells into fragments before the separating operations are begun. Hence, there is no necessity for the wet regrinding or repulping operations in present practices and these can be eliminated.

Dry milling may be done in several passes but because of the economy of power and equipment, this does not add materially to the cost. The yield of starch released is increased by at least 5 percent over wet methods and can be increased more by using a multiple stage system. Dry milling also permits selective screening, for example, the inner skin or rind of tapioca may be selectively screened off, and with it a large portion of the solubles, after the first pass, thereby facilitating the winning of the starch.

Furthermore, dry milling makes it possible to grind the material to a size, i.e., smaller than the cells themselves, which when slurried in water can be passed through a nozzle type of centrifuge. It is impossible by means of wet grinding to obtain a particle size of sufficient uniformity and small enough to pass through the nozzles of the nozzle type of centrifuge. This is one of the reasons prior art processes were not successful. Moreover, power costs for wet grinding are higher per unit of material than for dry grinding while capacities are lower. The milling requirements of both the machinery and the power for dry milling is about one-third that required for processing fresh tapioca roots. This, of course, permits a reduction in the size of the plant and capital investment. Also dry milling permits the operation to be done at one location and the wet separations at another.

Dry milling permits more starch containing cells to be opened and starch granules released hence when it is desired to convert the washed starch-fiber mixture, the starch can be hydrolyzed with greater ease.

The use of the nozzle type of centrifuge permits the use of lower gravity feeds than prior art equipment, hence better washing, and also prevents loss of starch to the overflow and obviates recycling.

The present invention also permits use of countercurrent washing systems for starch and fiber without the previously described processing difficulties of fungal growth and screen blinding.

Removal of solubles prior to separating operations makes it possible to separate the starch cells from the fibers of fine particle size (less than 100 microns). As already mentioned, in prior art systems where solubles are present during starch-fiber separating operations, the fiber becomes slimy and gummy which causes the starch granules to adhere tenaciously thereto. The finer the fiber the more difficult the separation but this is overcome by the present invention.

The present invention also affords other advantages. For example, it permits the manufacturer of root starch to operate his process during the entire year and in cooler climates than heretofore, in contrast to seasonal operations on fresh roots. Many of the problems of processing tapioca roots stem from the fact that tapioca roots are perishable and in the climate where they are grown, will not survive past 36–48 hours without considerable deterioration and considerable loss of starch content. This single characteristic imposes some rather severe limitations on the processors who venture into the production of tapioca starch from fresh roots.

In the tropical growing regions high rainfall prevents regular delivery of roots to the plant. Transportation is primitive and difficult with the result that a sustained grind over the year is virtually impossible. From experience it appears that factories in such areas cannot produce over 40–50 tons of starch a day; most plants produce five to ten tons a day. The radius of root delivery operation cannot extend over 60–70 kilometers since poor transportation means will not permit delivery of fresh roots from beyond this range. Most plants find that root supply is unsteady and unreliable from native grown sources and sooner or later are forced to resort to growing their own roots on a plantation scale close to the factory. This always tends to increase the cost of roots. A fresh root milling plant is essentially tied to the adjacent growing region (limited in size by transportation) and constantly at the mercy of the local economic and climatic conditions.

On the other hand, a plant and process designed to utilize dried tapioca roots or meal is essentially a more flexible unit and not as limited as the type operation described above. Of fundamental importance is the fact that the raw material used in the present invention is nonperishable; it can be kept for years with no more care than is usually given grain. Arising from this characteristic, first, a sustained grind can be maintained because the material can be stored; secondly, raw material can be obtained from many sources; all over the world tropical belt. The plant can be strategically placed with regard to markets, available labor, water supply, power supply, etc. It may even be incorporated into existing starch making facilities in northern climates.

It becomes apparent from the foregoing discussion that the advantages of dry milling coupled with the removal of the solubles at the earliest stage possible in a quick, effective manner represent a great step forward in the art and revolutionizes the art of processing starch-bearing materials.

I claim:

1. A process for treating dried starch-bearing materials to separate the soluble constituents from the insoluble constituents therein which comprises milling the dried material sufficiently to break the cells, containing the starch granules, into fragments, rehydrating the resultant flour with an aqueous medium and subjecting the resultant slurry to continuous centrifugal separation to separately remove the soluble constituents in an overflow, and the starch and fiber in an underflow.

2. Process according to claim 1 wherein the percent solids of said slurry is about 8 percent.

3. Process according to claim 1 wherein a preservative is added to said slurry.

4. Process according to claim 1 wherein said underflow is subjected to separating operations to recover the starch.

5. Process according to claim 1 wherein said underflow is subjected to hydrolysis to convert the starch to sugar-containing sirups.

6. Process according to claim 1 wherein the pH of the slurry is the same as that of the starch-bearing material in its natural state before being dried.

7. Process according to claim 1 wherein the separation is effected by a centrifuge characterized by return of a part of the underflow back into the centrifuge chamber.

8. Process according to claim 7 wherein wash water is mixed with the material being returned.

9. Process according to claim 7 wherein wash water is introduced independently into the periphery of the centrifuge bowl.

References Cited in the file of this patent

UNITED STATES PATENTS

| | | |
|---|---|---|
| 755,479 | Goldschmidt et al. | Mar. 22, 1904 |
| 2,050,330 | Jeffries | Aug. 11, 1936 |
| 2,084,250 | Fritze | June 15, 1937 |
| 2,380,874 | Schilling et al. | July 31, 1945 |
| 2,443,897 | Dexter et al. | June 22, 1948 |

UNITED STATES PATENT OFFICE
CERTIFICATE OF CORRECTION

Patent No. 3,072,501

January 8, 1963

Harry Meisel

It is hereby certified that error appears in the above numbered patent requiring correction and that the said Letters Patent should read as corrected below.

Column 1, line 47, for "iner" read -- inner --; column 3, line 37, for "binding" read -- blinding --.

Signed and sealed this 18th day of June 1963.

(SEAL)
Attest:

ERNEST W. SWIDER
Attesting Officer

DAVID L. LADD
Commissioner of Patents